United States Patent [19]

Fujiwara

[11] Patent Number: 4,794,649
[45] Date of Patent: Dec. 27, 1988

[54] RADIO COMMUNICATION SYSTEM WITH POWER SAVING DISABLEMENT PRIOR TO CALL HANDLING PROCESSES

[75] Inventor: Ryuhei Fujiwara, Tokyo, Japan
[73] Assignee: NEC Corporation, Japan
[21] Appl. No.: 43,866
[22] Filed: Apr. 29, 1987
[30] Foreign Application Priority Data
  May 6, 1986 [JP] Japan ................................ 61-103592
[51] Int. Cl.⁴ .......................... H04B 1/60; H04B 7/14
[52] U.S. Cl. ..................................... 455/9; 455/343;
  455/38; 455/70; 455/53; 340/825.44
[58] Field of Search ....................... 455/9, 343, 38, 68,
  455/58, 70, 53, 51, 54; 340/825.44, 825.48

[56] References Cited

U.S. PATENT DOCUMENTS

| | | | |
|---|---|---|---|
| 4,449,248 | 5/1984 | Leslie et al. | 455/38 |
| 4,509,199 | 4/1985 | Ichihara | 455/343 X |
| 4,577,315 | 3/1986 | Otsuka | 455/343 X |
| 4,679,244 | 7/1987 | Kawasaki et al. | 455/38 X |

Primary Examiner—Robert L. Griffin
Assistant Examiner—Ralph E. Smith
Attorney, Agent, or Firm—Laff, Whitesel, Conte & Saret

[57] ABSTRACT

A radio communication system comprises a base station for periodically transmitting a power saving signal and an information signal, a repeater station for relaying the signals, and a plurality of terminal stations for communicating with the base station through the repeater station. The repeater station includes power saving circuitry which responds to the power saving signal by cutting off power supplies to its major power consumptive components during a preset inteval which alternates with an active interval during which power is supplied to the components. Each terminal station includes power saving circuitry responsive to the power saving signal relayed by the repeater station to cut off power suplied to its major power consumptive components during the preset interval and power saving disabling circuitry for transmitting a power saving disabling signal to the repeater station during the active interval in response to a request for call and disabling its power saving circuitry for the duration of the preset interval. The repeater station responds to the power saving disabling signal from a terminal station to disable its power saving circuitry for the duration of the preset interval to thereby permit the information signal to be relayed to the terminal station which has transmitted the power saving disabling signal. The terminal station then transmits a call request signal to the repeater station to permit it to be handled during the interval in which power saving is disabled.

13 Claims, 6 Drawing Sheets

RADIO COMMUNICATION SYSTEM WITH POWER SAVING DISABLEMENT PRIOR TO CALL HANDLING PROCESSES

BACKGROUND OF THE INVENTION

The present invention relates to power saving for radio communication systems.

Periodic interruption of power supplies to the major power consumptive units of repeater and terminal stations of a radio communication system such as TDMA (time-division multiple access) radio concentrator systems, is a scheme known as power saving. Power saving of this type is essential to the operation of radio communication stations located at remote, thinly populated areas or emergency radio communication stations which rely on storage batteries. As shown and described in U.S. Pat. No. 4,577,315 issued to S. Otsuka, a power saving signal is constantly transmitted at periodic intervals from a base station and relayed by repeater stations to remote, terminal stations to cut off their power consumptive components for a preset time interval. However, origination of a call requires transmission of a long packet of data from terminal stations during an active interval of the system to request the base station to issue a series of signals according to protocols. In the disclosed prior art system, the transmission of a call origination request signal results in the disablement of power saving in the repeater and terminal stations to permit them to process the signals. Because of the lengthy packet in relation to the limited time interval during which transmission must be complete, call origination attempts from terminal stations tend to concentrate during the limited time interval and encouter data collision. When the transmitted data is destroyed by partial data overlap, the base station would generate a series of protocols, resulting in fruitless data exchanges along the network causing a system-wide traffic congestion.

SUMMARY OF THE INVENTION

It is therefore an object of the present invention to provide a radio communication system which eliminates systemwide traffic congestion which would otherwise be caused by call origination attempts made during a limited active time interval.

The above object is obtained by transmitting a disabling signal during the limited active period from a terminal station to a repeater station prior to the transmission of a call request signal. The disabling signal disables the power saving operations of the repeater station and the own terminal station and allows the latter to receive signals relayed through the active repeater station and send a call request signal to it so that a series of call processing signals can be handled during the power saving disabled period. Since the power saving disabling signal can be a short packet of data and induces no protocol actions in the base station, its probability of encountering collision is very slight and hence a systemwide traffic congestion cannot occur even if data collision occurs. Preferably, the power saving disabling signal is transmitted after a randomly determined period of time following a transition from an inactive period to an active period. In a further preferred form of the invention, the terminal station is arranged to transmit a call request signal after a randomly determined period following the reception of a signal relayed by the repeater station which is rendered active in response to the disabling signal.

Specifically, a radio communication system of the invention comprises a base station for transmitting a power saving signal and an information signal, a repeater station for relaying the signals, and a plurality of terminal stations for communicating with the base station through the repeater station. The repeater station includes power saving circuitry responsive to the power saving signal to cut off power supplies to its major power consumptive components during a preset interval which alternates with an active interval during which power is supplied to the components. Each terminal station includes power saving circuitry responsive to the power saving signal relayed by the repeater station to cut off power supplies to its major power consumptive components during the preset interval and power saving disabling circuitry for transmitting a power saving disabling signal to the repeater station during the active interval in response to a request for call and disabling its power saving circuitry for the duration of the preset interval. The repeater station includes power saving disabling circuitry which is responsive to the power saving disabling signal from a terminal station to disable its power saving circuitry for the duration of the preset interval to thereby permit the information signal to be relayed to the terminal station which has transmitted the power saving disabling signal. Each terminal station transmits a call request signal to the repeater station to thereby permit it to be handled during the interval in which power saving is disabled.

BRIEF DESCRIPTION OF THE DRAWINGS

The present invention will be described in further detail with reference to the accompanying drawings, in which.

DETAILED DESCRIPTION

Figure 1:
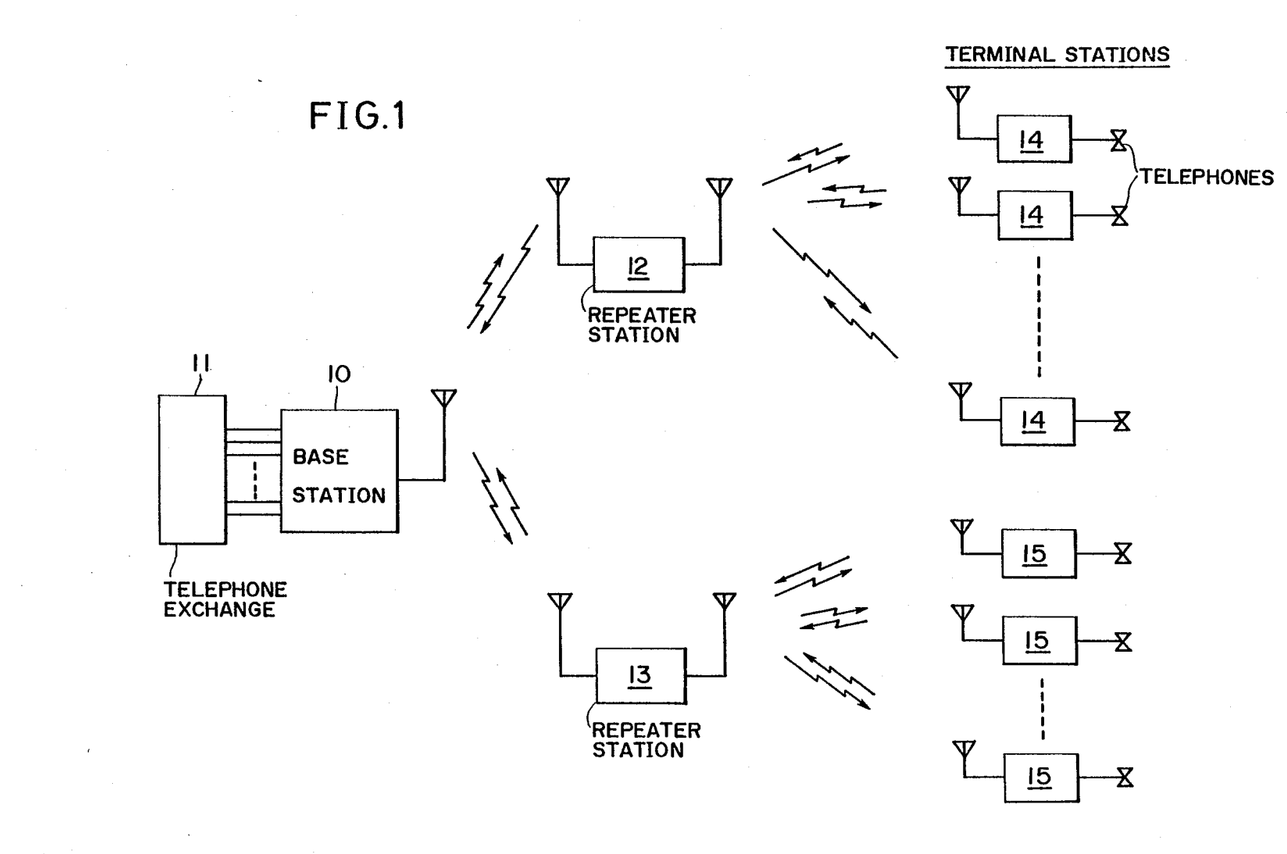
FIG. 1 is an illustration of a digital radio concentrator system.

As represented in FIG. 1, a time division multiple access (TDMA) radio concentrator system of the invention comprises a base station 10 connected to subscriber line terminals of an end office switching system 11 of the public telecommunication network, repeater stations 12 and 13 and terminal stations 14 and 15 which are located in remote, thinnly populated areas. Terminal stations 14 are located in an area that is appropriate for establishing communications with the repeater station 12 and terminal stations 15 are located in another area appropriate for communications with the repeater station 13. All the terminal stations 14 and 15 have their corresponding subscriber line terminals at the end office switching system 11. As viewed from the end office switching system, the base station 10 provides line concentration by switching the subscriber lines to a smaller number of "downstream" TDMA channels and as viewed from the terminal stations it provides deconcentration by switching the "upstream" TDMA channels to the subscriber lines. Each terminal station has connected to it a subscriber station such as telephone and telefax machine. All the repeater and terminal stations operate on individual battery supplies.

Figure 2:
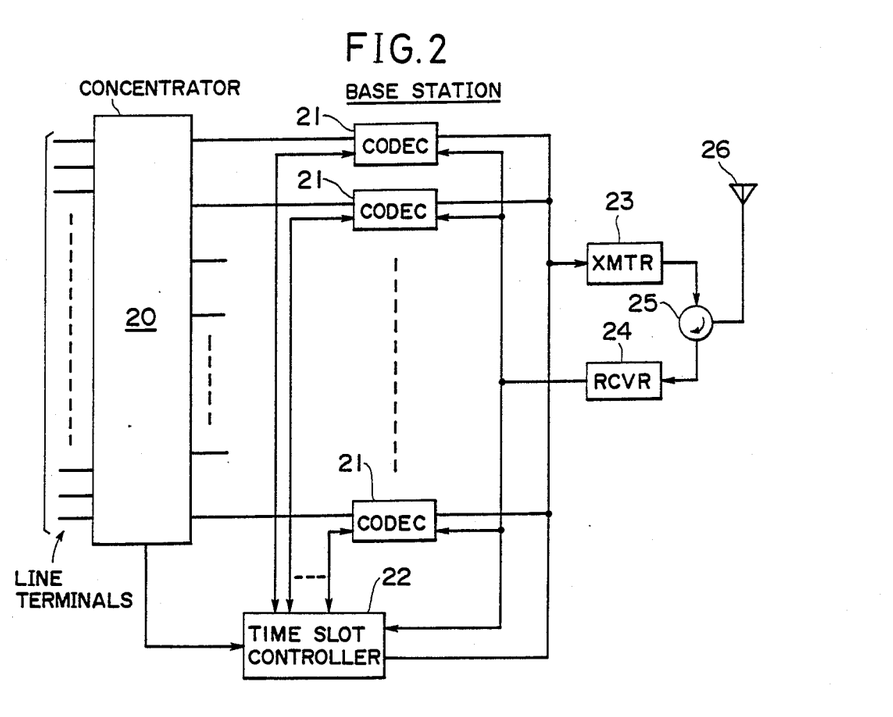
FIG. 2 is a block diagram of a base station.

In FIG. 2, the base station comprises a line concentrator 20, a plurality of PCM codecs (coder/decoders) 21 provided in number corresponding to the number of two-way TDMA channels and a time slot controller 22. Time slot controller 22 is associated with each of the codecs 21, concentrator 20, radio transmitter 23 and radio receiver 24. Each codec 21 has a hybrid, a PCM coder for encoding an outgoing analog signal coupled through the hybrid from the concentrator 20 and applying the encoded outgoing signal on a specified outgoing time slot to transmitter 23 and a PCM decoder for decoding an incoming digital signal from receiver 24 on a specified incoming time slot and applying the decoded signal through the hybrid to the concentrator 20. Transmitter 23 modulates a carrier with the TDM bit stream using a digital modulation technique and amplifies the modulated carrier to a level sufficient for transmission, the output of transmitter 23 being coupled through duplexer 25 to antenna 26. Receiver 24 amplifies and demodulates a digitally modulated RF signal received by antenna 26 to recover baseband TDM signals.

Figure 3:
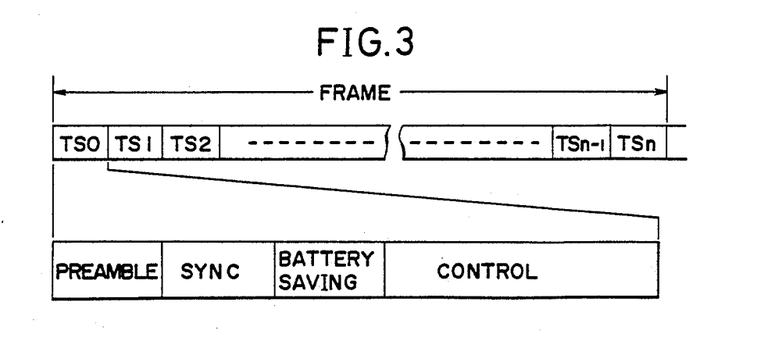
FIG. 3 is an illustration of the format of data transmitted constantly from the base station.

As illustrated in FIG. 3, time-slot controller 22 generates a timing reference to permit each codec to determine a particular one of the time slots TS0 to TSn of a "frame". Time slot TS0 comprises a plurality of "fields". The first field contains a preamble from which the receiving stations recover clock signals. Typically, the preamble consists of a series of 16 bits of alternating binary 1's and 0's. A frame sync code, which is also a 16-bit series of a unique code format (typically, "1010010100110110"), is inserted to the second field of the time slot TS0. A battery saving (BS) code is inserted to the third field of the first time slot and is followed by a control field in which signaling and time slot assignment information is inserted. The BS code determines the timing reference with which all the repeater and terminal stations are synchronized to cut off their battery supplies at periodic intervals to conserve their power. The BS code comprises "1010" (BS-ON) for power cut-off and "0101" (BS-OFF) for power restoration. To achieve most efficient power savings, frames containing the BS-ON code are repeated so as to continue for a period of time much longer than the period in which frames having the BS-OFF code continue. As will be described later, the frames containing the BS-ON code are termed "D-frames" and those containing the BS-OFF code are termed "C-frames". The time slot TS0 is followed by a series of information carrying time slots TS1 to TSn each having a 16-bit time-slot sync having a bit pattern "101001010011011" which differs from the frame sync in that the least significant bit is a binary 1. The time slots TS1 to TSn correspond respectively to the codecs 21. A consecutive series of power-cutoff D-frames alternates with a consecutive series of power-restoration C-frames and transmitted from the antenna 26 on a broadcast mode through repeater stations 12 and 13 to all terminal stations 14 and 15.

Figure 4:
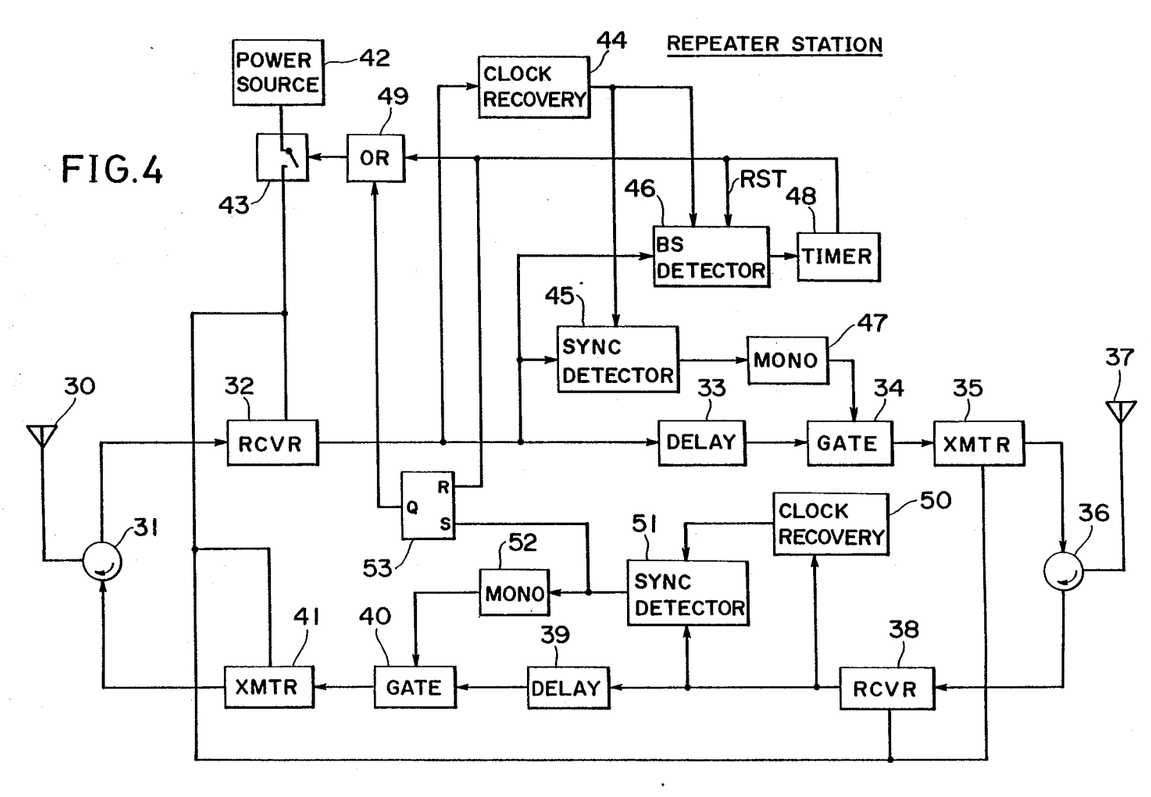
FIG. 4 is a block diagram of a repeater station.

FIG. 4 illustrates details of each repeater station. The broadcast time-division multiplexed signal is intercepted by an antenna 30 and applied through duplexer 31 to a radio receiver 32 and applied on a "downstream" signal transmission path including a delay 33 and a gate 34 to a radio transmitter 35 whose output is coupled through duplexer 36 to antenna 37. Burst signals transmitted on assigned time slots from the associated terminal station are received by antenna 37, passed through duplexer 36 to a radio receiver and applied on an "upstream" signal transmission path including a delay 39 and a gate 40 to a radio transmitter 41 and thence to duplexer 31. Receivers 32, 38 and transmitters 35 and 41, which are the main power consumptive components of the repeater station, are powered from a power source, or storage batteries 42 through normally open contacts of a power-saving switch 43 which is controlled in a manner as will be described.

Receiver 32 amplifies the downstream radio-frequency TDM signal and demodulates it to recover the baseband TDM signal. The output of receiver 32 is applied to a clock recovery circuit 44, a sync detector 45 and a BS detector 46. Clock recovery circuit 44 detects a preamble from the received bit stream to recover clock timing and supplies clock pulses to sync detector 45 and BS detector 46. Sync detector 45 essentially comprises a shift register which is clocked by the clock recovery circuit 44 to accept the output of receiver 32 and a digital comparator which compares the binary states of the loaded data bit stream with the code format of the sync and generates an equality output when they match, this output being applied as a trigger signal to a monostable multivibrator 47 and as an enabling signal to the BS detector 46. The downstream TDM output of receiver 32 is timed by delay 33 so that it passes to the transmitter 35 through gate 34 in response to a gate-on pulse from the monostable 47. Transmitter 35 modulates the output of gate 34 upon a carrier frequency different from the carrier frequency transmitted from the base station and applies it through duplexer 36 to antenna 37. The BS detector 46 is constructed in a manner similar to sync detector to detect the BS-ON code immediately following the detection of a sync code by sync detector 45. A timer 48 is connected to the output of BS detector 46 to operate the battery-saving switch 43 through an OR gate 49. Timer 48 may be formed of a monostable multivibrator and an inverter connected to the output of the monostable to generate a logical 0 output (power cutoff signal) of a duration slightly longer than the duration of a series of D-frames in response to the receipt of a single BS-ON code that occurs at the first of the series of D-frames.

Figure 5:
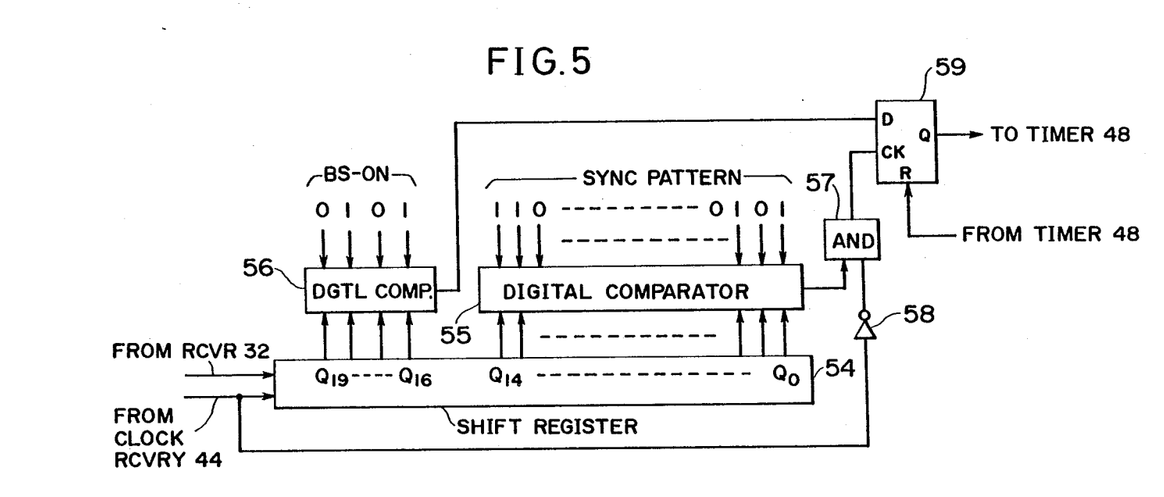
FIG. 5 is a circuit diagram of a battery saving code detector.

As shown in FIG. 5, BS detector 46 is implemented by a shift register 54 which is clocked by the clock recovery circuit 44 to receive the output of receiver 32. A digital comparator 55 compares the common bit pattern (i.e., the 15-bit pattern of "10100101001101") of the frame and time-slot sync codes with the contents of the binary positions Q0 to Q14 of the shift register 54 to supply a coincidence output upon the arrival of each frame and time-slot sync code to an AND gate 57 to which the clock pulses are also applied through an inverter 58. A second digital comparator 56 makes comparison with the BS-ON code pattern "1010" with the contents of the binary positions Q16 to Q19 of the shift register to supply a coincidence output at the beginning of each frame to the D input of a D-flip-flop 59 having a clock input to which the output of AND gate 57 is applied. The output of timer 48 is connected to the reset input of D-flip-flop 59 to prevent it from responding to BS-ON codes that occur after the timer 48 has been activated in response to the detection of a BS-ON code of first occurrence during the power saving disablement. In operation, the output of D-flip-flop 59 switches to a significant binary level at the trailing edge of a pulse from clock recovery circuit 44 when the flip-flop is supplied with logical 1 outputs from both comparators during the first time slot TS0 and switches to an insignificant binary level at the trailing edge of a subsequent clock pulse when the flip-flop is supplied with logical 1 and 0 outputs from comparators 55 and 56, respectively, during the second time slot TS1. Thus, D-flip-flop 59 generates an output pulse with a duration of a single time slot at the starting point of each D-frame.

During the time the output of timer 48 is at logical 0, the switch 43 remains open to cut off power supplies to the power consumptive units. At the end of the preset interval, the output of timer 48 automatically switches to a logical 1 level to cause the switch 43 to close its contacts to reactivate the power consumptive units.

In the "upstream" section of the repeater station, the receiver 38 amplifies the radio-frequency TDM signal from antenna 37 and demodulates it to recover the baseband TDM signal which is applied to a clock recovery circuit 50. Clock recovery circuit 50 detects a preamble from the bit stream received from the terminal stations and recovers clock timing. A sync detector 51 is synchronized to the clock pulse from the clock recovery circuit 50 and detects a sync code contained in the received TDM bit stream. The output of sync detector 51 drives a monostable multivibrator 52 to open the gate 40 to pass the TDM bit stream, which is appropriately timed by the delay 39, to transmitter 41 where it is modulated upon a particular carrier frequency and amplified for transmission to the base station. According to the present invention, a battery saving inhibit flip-flop 53 is provided. This flip-flop responds to the output of sync detector 51 by supplying a logical 1 output through OR gate 49 to switch 43 to inhibit battery saving operation and further responds to the logical 1 output (power restoring signal) of timer 48 by supplying a logical 0 output to switch 43 to allow it to open its contacts to resume battery saving operation.

Figure 6:
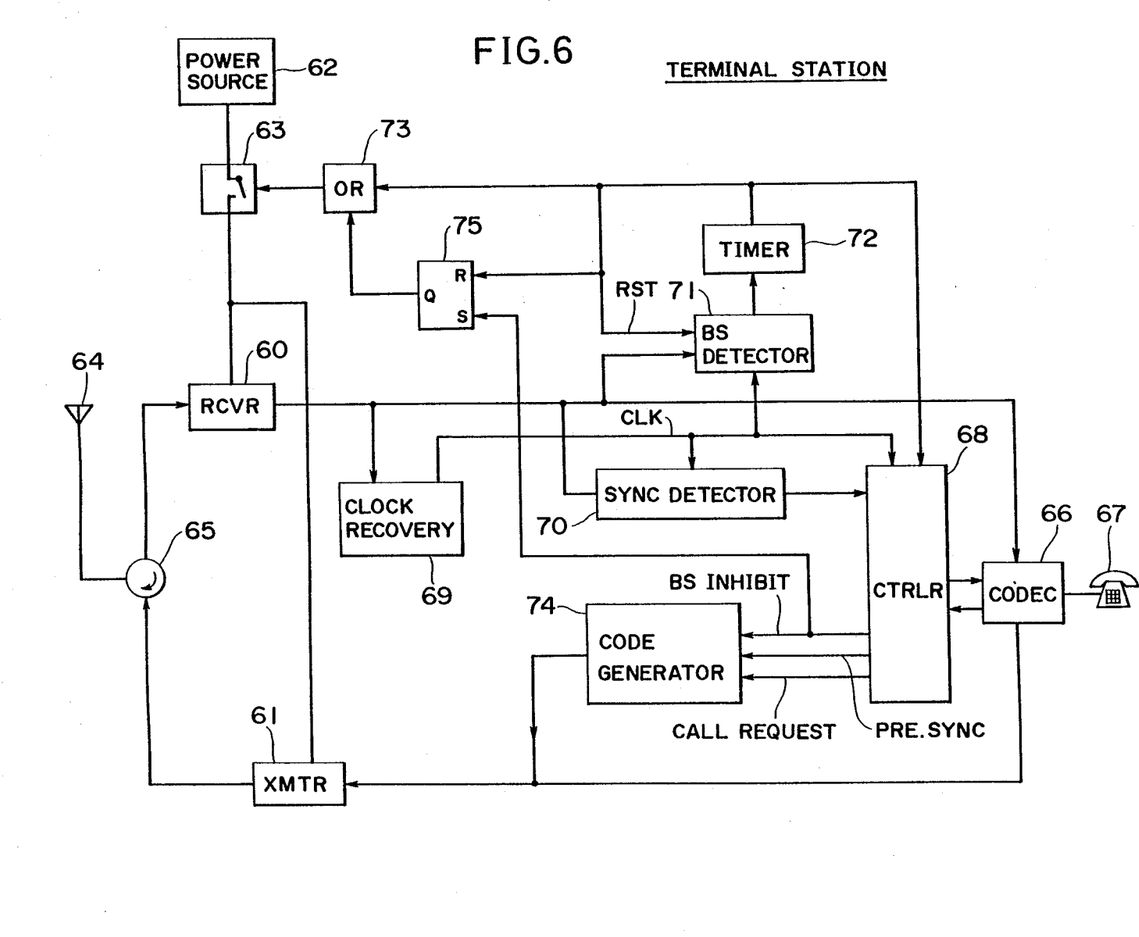
FIG 6 is a block diagram of a terminal station.

In FIG. 6, each terminal station couples battery supplies to a receiver 60 and a transmitter 61 from a storage battery 62 through a power saving switch 63. The relayed radio-frequency TDM signal is intercepted by antenna 64 and applied through duplexer 65 to receiver 60 where it is amplified and demodulated. The output of receiver 60 is applied to the decoder input of a PCM codec 66, the encoder output of which is connected to transmitter 61. Codec 66 is connected over a subscriber line to a telephone set 67 to convert the analog speech signal into digital form and insert the digital signal to a time slot specified by a controller 68 for application to transmitter 61. Codec 66 detects a digital signal on a specified time slot of the recovered TDM baseband signal and converts it to an analog form for application to the telephone 67. A clock recovery circuit 69 derives clock timing from the preamble of the relayed bit stream and causes a sync detector 70 to detect a sync code immediately following the preamble. Sync detector 70 enables a BS detector 71 to detect a BS-ON code from the battery saving field of the bit stream. In a manner similar to the repeater station, the BS detector 71 drives a timer 72 upon detection of a BS-ON code to cause a power cutoff signal of the same duration as in the repeater station to be ggenerated. This power cutoff signal is applied through an OR gate 73 to power saving switch 63.

Controller 68 is responsive to the outputs of clock recovery circuit 69 and sync detector 70 to detect the time slot on which the "downstream" signal is carried to cause the codec 66 to decode the digital signal on the detected time slot to analog form for application to telephone 67 and specify a time slot on which the "upstream" digital signal to be inserted. A code generator 74 is connected to the controller 68 to generate a bit sequence comprising a preamble and a sync code to be inserted to the beginning of a specified time slot to permit the receiving stations to establish clock and frame synchronization whenever speech or signaling information is transmitted.

Figure 7A:
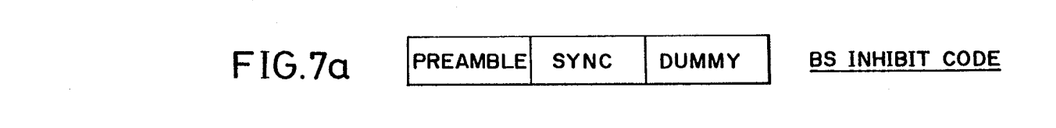
FIGS. 7a and 7b are illustrations of the formats of data transmitted from the terminal station according to the invention.

In order to eliminate the prior art problems by reducing the chances of data collision during call setup periods, controller 68 monitors the output of timer 72 to detect a transition from an active interval (BS-OFF) to an inactive interval (BS-ON) and generates a battery saving inhibit command signal after a random time period following the detection of the transition which occurs after telephone 67 goes off hook for call origination. This BS inhibit command signal is applied to the code generator 74 to cause a BS inhibit code to be generated. This inhibit code comprises a preamble, a sync code and a dummy code as shown in FIG. 7a to be transmitted to the repeater station to inhibit its battery saving operation. This BS inhibit command signal is also applied to the set input of a battery saving inhibit flip-flop 75 to cause it to apply a logical 1 output through OR gate 73 to switch 63 to close its contacts. Flip-flop 75 is reset in response to a power cutoff signal from timer 72 to apply a logical 0 output to switch 63 to resume battery saving operation.

Figure 7B:
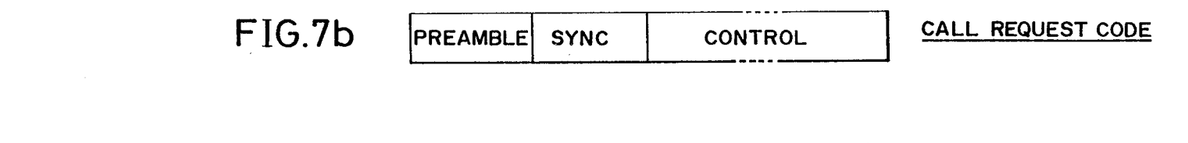

Following the transmission of a BS inhibit burst, controller 68 is conditioned to monitor the arrival of a sync code contained in a received bit stream to recognize that the battery saving operation is inhibited in the associated repeater station. On recognizing this fact, the controller 68 proceeds to apply a call request command signal to the code generator 74 after a random time period following the detection of a "downstream" sync code to cause a call request code to be generated. This call request signal comprises a preamble, a sync code and control codes as shown in FIG. 7b. The length of this signal is much longer than the BS inhibit signal of FIG. 7a.

Figure 8:
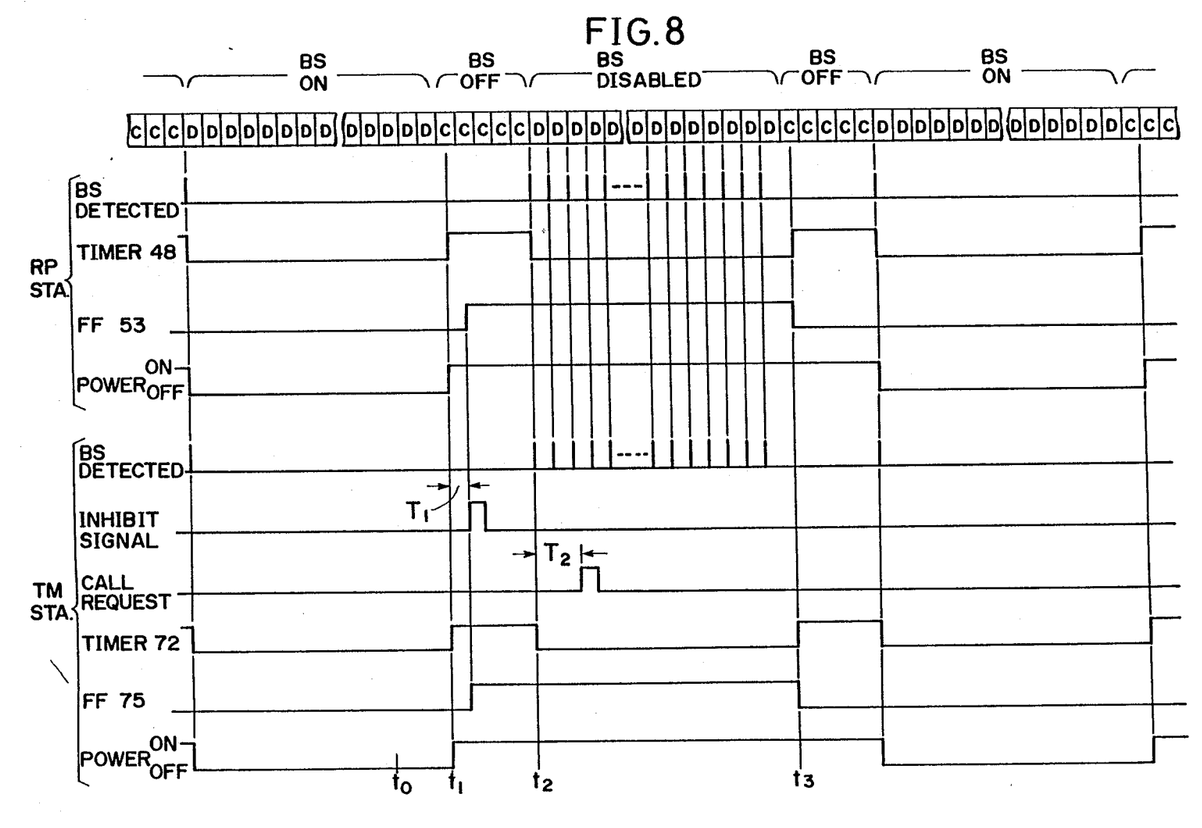
FIG. 8 is a time diagram useful for a full understanding of the present invention.

For a full understanding of the present invention, reference is now made to a time diagram shown in FIG. 8. Base station 10 constantly broadcasts a series of C-frames and a series of D-frames during alternate periods, so that power supplies are cut off in synchronism in all the repeater and terminal stations. More specifically, in each repeater station, sync detector 45 monitors the BS field of each frame. When the repeater station is in receipt of a series of C-frames, timer 48 causes a power supply signal to be applied to switch 43 to supply power to its power consumptive units. When it is receiving a series of D-frames, timer 48 switches its output state to cause a power cutoff signal to be applied to switch 43 to cut off power supplies to the power consumptive units. In a similar manner, in each terminal station, sync detector 71 monitors the BS field of each frame relayed from the associated repeater station. When the terminal station is in receipt of a series of C-frames, timer 72 causes a power supply signal to be applied to switch 63 to supply power to its power consumptive units. When it is receiving a series of D-frames, timer 72 switches its output state to cause a power cutoff signal to be applied to switch 63 to cut off power supplies to the power consumptive units.

Assume that a call is originated from a terminal station at time $t_0$ during the time the whole system is in an inactive mode. Controller 68 monitors the output of timer 72 and generates a BS inhibit command signal after a random time period $T_1$ following the occurrence of a power supply signal (logical 0) at the output of timer 72 at time $t_1$, whereupon the system enters an active mode. The BS inhibit command signal is applied to the code generator 74 to cause a BS inhibit signal (FIG. 7a) to be applied to transmitter 61 and transmitted and received by the associated repeater station. Concurrently, the BS inhibit command causes a power-saving disablement signal (logical 1) to be supplied from flip-flop 75 through OR gate 73 to the switch 63 so that its contacts are kept closed during the period following the termination of the power supply signal from the timer 72.

In the repeater station, clock timing is recovered from the preamble of the received inhibit signal by the clock recovery circuit 50 and fed to the sync detector 51 to enable it to detect a sync code. Flip-flop 53 is triggered into set condition in response to the sync code, applying a power-saving disablement signal (logical 1) through OR gate 49 to switch 43 to keep its contacts closed during the period following the termination of the power supply signal from the timer 48 in a manner similar to the terminal station. At time $t_2$, the "downstream" TDMA signal changes from C-frames to D-frames and timers 48 and 72 of the repeater and terminal stations change their outputs to logical 0. Therefore, the other repeater station and terminal stations enter an inactive mode at time $t_2$. On the other hand, due to the presence of the power saving disablement signals at the outputs of flip-flops 53 and 75 of the stations exchanging the BS inhibit signal, their power saving modes are disabled regardless of the arrivals of successive BS-ON codes. By virtue of the resetting of the D-flip-flop 59, such BS-ON codes produce no adverse effect on the timing action of timer 48. The same applies to the timer 72 of terminal station. As a result, their timing outputs change to logical 0 level at time $t_3$ following the next transition from D-frames to C-frames.

After transmission of a BS inhibit signal, the controller 68 of the terminal station is conditioned to monitor the output of sync detector 70. If it detects a sync code from the "downstream" TDMA signal at time $t_2$, the controller 68 recognizes that the repeater station is still active and initiates measurement of the length of time elapsed from time $t_2$. When a randomly determined amount of time $T_2$ is reached, the controller 68 issues a call request command to the code generator 74 to cause a call request signal (FIG. 7b) to be transmitted and received by the repeater station and relayed to the base station 10 to permit it to handle the call request signal during the time period in which the repeater and terminal stations concerned would otherwise remain inactive. This power saving disablement expires at time $t_3$ and the whole system again enters an active state to allow various stations to reinitiate call handling actions. It is to be noted that the BS inhibit signal requires no protocol operation. Thus, collisiosn of a BS inhibit signal does not result in a system failure. Since the call request signal is processed when power saving is disabled and this interval is much longer than the active interval, there is a freedom of choice for the determination of the time at which the call request signal can be transmitted. Since the call request signal has a long wordlength which implies a high likelihood of data collision and this type of signal induces protocol operations in the base station, data collision of the call request signal would result in transmissions of meaningless data bits causing a systemwide traffic congestion. However, the freedom of choice allowed for the transmission of the call request signal serves to avoid data collision and hence systewide congestion. Furthermore, the BS inhibit signal and call request signal are transmitted at randomly determined times $T_1$ and $T_2$, there is a very slight chance of collision with signals transmitted from other stations. To further decrease the chance of data collision, it is preferred that such signals be transmitted in succession at random times.

The foregoing description shows only preferred emoodiments of the present invention. Various modifications are apparent to those skilled in the art without departing from the scope of the present invention which is only limited by the appended claims. Therefore, the embodiments shown and described are only illustrative, not restrictive.

What is claimed:

1. A radio communication system comprising:
    a base station for transmitting a power saving signal and an information signal at periodic intervals;
    a repeater station operating alternately between a preset interval and an active interval for relaying said power saving and information signals during said active interval, said repeater station including power saving means responsive to said power saving signal to cut off power supplies to major power consumptive components thereof during said preset interval, and power saving disabling means; and
    a plurality of terminal stations operating alternately between said preset interval and said active interval for communicating through said repeater station with said base station, each of said terminal stations including power saving means responsive to said power saving signal relayed by said repeater station to cut off power supplies to major power consumptive components thereof during said preset interval, and power saving disabling means for transmitting a power saving disabling signal to said repeater station during said active interval in response to a request for call and disabling said power saving means thereof for the duration of said preset interval,
    said power saving disabling means of said repeater station being responsive to said power saving disabling signal from said terminal stations for disabling said power saving means thereof for the duration of said preset interval to thereby permit said information signal to be relayed to the terminal station which has transmitted said power saving disabling signal, and
    each of said terminal stations including means responsive to said relayed information signal for transmitting a call request signal to the repeater station to thereby permit said call request signal to be relayed by the repeater station during the preset interval immediately following the transmission of said power saving disabling signal.

2. A radio communcation system as claimed in claim 1, wherein said power saving disabling signal is transmitted after a randomly determined period of time following the occurrence of a transition from the preset interval to the active interval.

3. A radio communication system as claimed in claim 2, wherein said call request signal is transmitted after a randomly determined period of time following the reception of the relayed information signal by said terminal station.

4. A radio communication system as claimed in claim 1, wherein the power saving means of said repeater station comprises:
   detector means for detecting said power saving signal; and
   timer means for generating an output having a predetermined duration longer than the interval between successive ones of said power saving signal in response to the detection of said power saving signal by said detector means, said detector means being disabled in the presence of the output signal of said timer means.

5. A radio communication system as claimed in claim 4, wherein the power saving means of each of said terminal stations comprises:
   detector means for detecting said power saving signal relayed by said repeater station; and
   timer means for generating an output having a predetermined duration longer than the interval between successive ones of said relayed power saving signal in response to the detection of said relayed power saving signal by said detector means, said detector means being disabled in the presence of the output signal of said time means.

6. A radio communication system comprising:
   a base station for transmitting a power saving signal and an information signal at periodic intervals;
   a plurality of repeater stations operating alternately between a preset interval and an active interval for relaying said power saving and information signals, each of said repeater stations including power saving means responsive to said power saving signal to cut off power supplies to major power consumptive components thereof during said preset interval, and power saving disabling means;
   a plurality of terminal stations operating alternately between said preset interval and said active interval for communicating through said repeater station with said base station, each of said terminal stations including power saving means responsive to said power saving signal relayed by an associated one of said repeater stations to cut off power supplies to major power consumptive components thereof during said preset interval, and power saving disabling means for transmitting a power saving disabling signal to said associated repeater station during said active interval in response to a request for a call and for disabling the power saving means thereof for the duration of said preset interval,
   the power saying disabling means of each of said repeater stations being responsive to said power saving disabling signal from the terminal stations for disabling the power saving means thereof for the duration of said preset interval to thereby permit said information signal to be relayed to the terminal station which has transmitted said power saving disabling signal,
   each of said terminal stations including means responsive to said relayed information signal for transmitting a call request signal to the associated repeater station to thereby permit said call request signal to be relayed by the associated repeater station during the preset interval immediately following the transmission of said power saving disabling signal.

7. A radio communication system as claimed in claim 6, wherein said power saving disabling signal is transmitted after a randomly determined period of time following the occurrence of a transition from the preset interval to the active interval.

8. A radio communication system as claimed in claim 7, wherein said call request signal is transmitted after a randomly determined period of time following the reception of the last-mentioned relayed signals by said terminal station.

9. A radio communication system as claimed in claim 6, wherein the power saving means of each of said repeater stations comprises:
   detector means for detecting said power saving signal; and
   timer means for generating an output having a predetermined duration longer than the interval between successive ones of said power saving signal in response to the detection of said power saving signal by said detector means, said detector means being disabled in the presence of the output signal of said timer means.

10. A radio communication system as claimed in claim 9, wherein the power saving means of each of said terminal stations comprises:
    detector means for detecting said power saving signal relayed by said repeater station; and
    timer means for generating an output having a predetermined duration longer than the interval between successive ones of said relayed power saving signal in response to the detection of said relayed power saving signal by said detector means, said detector means being disabled in the presence of the output signal of said timer means.

11. A power saving method for a radio communication system, wherein the system comprises a base station connected to a telecommunication switching system, a repeater station for relaying said signals, and a plurality of terminal stations for communicating through said repeater station with said base station,
    transmitting from said base station a power saving signal and an information signal so that said signals are relayed by said repeater station to said terminal stations;
    effecting a power saving operation by cutting off power supplies to major power consumptive components of said repeater station and said terminal stations in response to said power saving signal during a preset interval which alternates with an active interval;
    transmitting from one of said terminal stations a power saving disabling signal to the repeater station during said active interval in response to a request for call;
    disabling said power saving operation of said one terminal station and said repeater station for the duration of said preset interval to thereby permit said information signal to be relayed to said one terminal station; and
    detecting the information signal relayed by the repeater station to said one terminal station and transmitting therefrom a call request signal to said repeater station to permit the call request signal to be relayed to said base station and processed during the preset interval which follows the transmission of said power saving disabling signal.

12. A method as claimed in claim 11, wherein said power saving disabling signal is transmitted after a randomly determined period of time following the occurrence of a transition from said preset interval to the active interval.

13. A method as claimed in claim 12, wherein said call request signal is transmitted after a randomly determined period of time following the detection of the relayed information signal by said one terminal station.

* * * * *